J. C. Clime,
Scroll Sawing Machine.
Nº 19,893.   Patented Apr. 6, 1858.
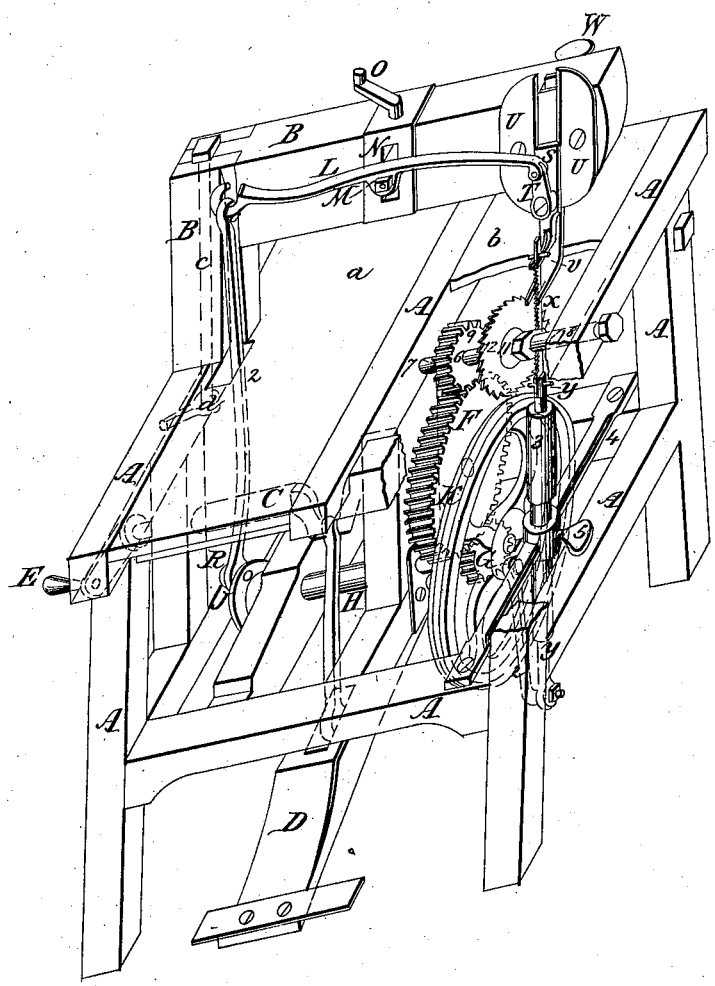
Witnesses:
J. E. Shaw
Jno. A. Burton
Inventor
John C. Clime

UNITED STATES PATENT OFFICE.

J. C. CLIME, OF PHILADELPHIA, PENNSYLVANIA, ASSIGNOR TO HIMSELF AND SAML. RHODES, OF SAME PLACE.

METHOD OF GUIDING RECIPROCATING SCROLL-SAWS.

Specification of Letters Patent No. 19,893, dated April 6, 1858.

*To all whom it may concern:*

Be it known that I, JOHN C. CLIME, of Philadelphia, in the county of Philadelphia and State of Pennsylvania, have invented certain new and useful Improvements in Scroll-Sawing Machines for Foot or Hand Power; and I do hereby declare that the following is a full and exact description thereof, reference being had to the annexed drawing, representing a perspective view of the complete machine.

In the drawing (A) represents a strong wooden frame or table well braced with bolts and the top of which (*a*, *b*) is removable when required. An overhanging arm or cross-head (B) is secured to the table by means of a strong iron bolt (*c*) and nut (*d*) and is removable at pleasure.

(C) is the driving shaft to which the power is applied either by means of the treadle (D) or by hand at the crank (E), and in some cases when great power is required by means of both.

F, is the driving wheel gearing into the wrought-iron pinion (G) arranged on the crank-shaft (H).

(I), is a crank-wheel adjustable on the driving shaft by a set screw. (K) is the fly wheel also on shaft (H).

(L) is a steel spring swivel acting on a center pin (M) which pin passes into a slot (N) in the cross-head (B) where it enlarges into the form of a nut.

(O) is a crank screw working through this nut against the bottom of the slot and serves to tighten or loosen the swivel (L) thereby straining the saw. The swivel (L) is made stiff in the middle and tapering to either end, so as to be sufficiently elastic to give a smooth motion to the saw when it is passing the dead points. At one end, the swivel (L) is connected with crank wheel (I) by a detachable iron rod (Q).

(R) is a washer crank-pin for securing rod (Q) to crank wheel (I). At the other end the swivel (L) is connected with the slide (S) by a link (T). The slide (S) is grooved on its sides, has a reciprocating motion in the guides (U), and forms a slotted hook at its lower extremity, to hold one end of the saw.

(V) is a guard adjustable by a set screw (W). (X) the saw is connected with the slide (S) at its upper end and with the steel sliding rod (Y) at its lower end. This sliding rod (Y) is smoothly finished to fit and works through a tubular guide (Z) of brass, iron or other suitable material and is connected at its lower end with the crank (1) on the fly wheel, by the connecting rod (2).

(3) is an adjustable cap which is screwed over the guide (Z) on to the sliding rod (Y), the end of which is provided with a screw thread for the purpose, and gives effectual protection to the parts just described against the saw dust. The tubular guide (Z) passes through an iron brace (4) and is adjusted and made stationary by the set screw (5).

In order to make a convenient machine for shop use I have aimed so to combine and arrange the various parts as to make them easily adaptable to the employment of a circular saw, when occasion requires. For this purpose I employ an ordinary mandrel (6), pivoted at (7), and (8), having a cast-steel pinion (9) directly over and gearing into the driving wheel (F).

When it is desired to adapt the machine to the circular saw, the whole operation is performed by an expert workman within the space of time of five minutes, and consists in relaxing the swivel (L), removing the jig saw (X) and the top (*b*) of the table, the n removing the connecting rod (Q), then, by loosening the bolt (10), removing or turning out of the way the cross-head (B), and lastly unscrewing the pivot bearing of the mandrel and slipping the circular saw into place between the washer (11) and the mandrel head (12).

Hitherto much difficulty has arisen from the imperfect modes employed of protecting the moving lower parts of the machine below the saw from the saw dust. The adjustable cap (Z) and the arrangement above described effectually and completely overcome this difficulty.

Having thus described my invention what I claim and desire to secure by Letters Patent is—

The employment of a cap (3) in combination with a tubular guide (Z) in the manner and for the purpose substantially as above set forth.

JOHN C. CLIME.

Witnesses:
 I. E. SHAW,
 JNO. A. BURTON.